United States Patent [19]

Olbrich

[11] Patent Number: 5,243,800
[45] Date of Patent: Sep. 14, 1993

[54] INSTALLATION DUCT FOR UTILITY LINES

[75] Inventor: Kurt Olbrich, Mossautal-Hiltersklingen, Fed. Rep. of Germany

[73] Assignee: Hewing GmbH, Ochtrup, Fed. Rep. of Germany

[21] Appl. No.: 834,034

[22] Filed: Feb. 11, 1992

[30] Foreign Application Priority Data

Mar. 18, 1991 [DE] Fed. Rep. of Germany ... 9103262[U]

[51] Int. Cl.$^5$ .................. E04F 19/08; E04F 17/08
[52] U.S. Cl. .................. 52/287; 52/220.1;
  52/220.5; 52/288; 52/716.2; 52/718.01;
  52/718.04
[58] Field of Search ............ 52/287, 718.1, 220,
  52/716, 288, 220.1, 220.5, 220.7; 174/48, 49

[56] References Cited

U.S. PATENT DOCUMENTS

| | | | |
|---|---|---|---|
| 2,132,400 | 10/1938 | Curren | 52/716 |
| 3,473,278 | 10/1969 | Gossen | 52/220 |
| 3,956,861 | 5/1976 | Rasmossen | 52/287 |
| 4,343,507 | 8/1982 | Heuer et al. | 296/208 |
| 4,691,392 | 9/1987 | Whitney | 4/595 |

FOREIGN PATENT DOCUMENTS

| | | | |
|---|---|---|---|
| 1326369 | 9/1964 | France | 52/287 |
| 1511870 | 2/1968 | France | 52/287 |

Primary Examiner—Carl D. Friedman
Assistant Examiner—Matthew E. Leno
Attorney, Agent, or Firm—Jordan and Hamburg

[57] ABSTRACT

An installation duct for utility lines, particularly for pipes, cables, etc., which forms with a retaining strip on the wall, as well as with a capping that can be fastened to the retaining strip, a cable or pipe duct which is closed at the periphery, upper and lower connectors being provided for connecting the retaining strip and the capping, of which the one connector is constructed as a catch and the other as a lock, which comprises an abutment at the retaining strip and a latch clasp, which can be secured behind this abutment at the capping. In order to provide, in particular, a cable or pipe duct, which in variable configurations can be made to fit different pipe diameters, the two connectors are connected as step connectors and border a cable or pipe duct, the internal dimensions of which can be varied depending on the connecting step selected 21 Claims, 3 Drawing Sheets

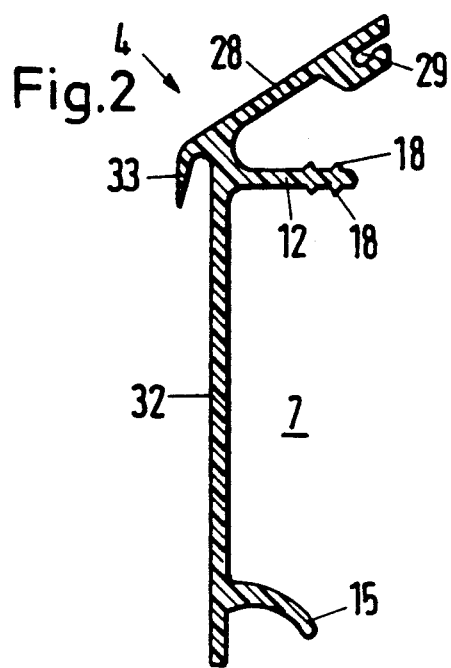
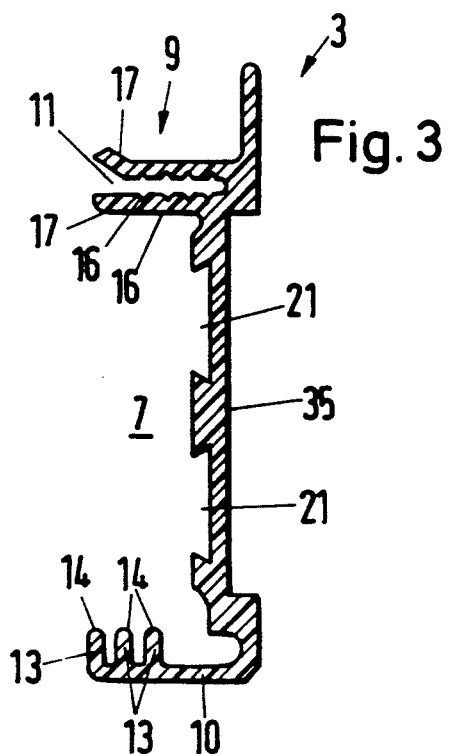
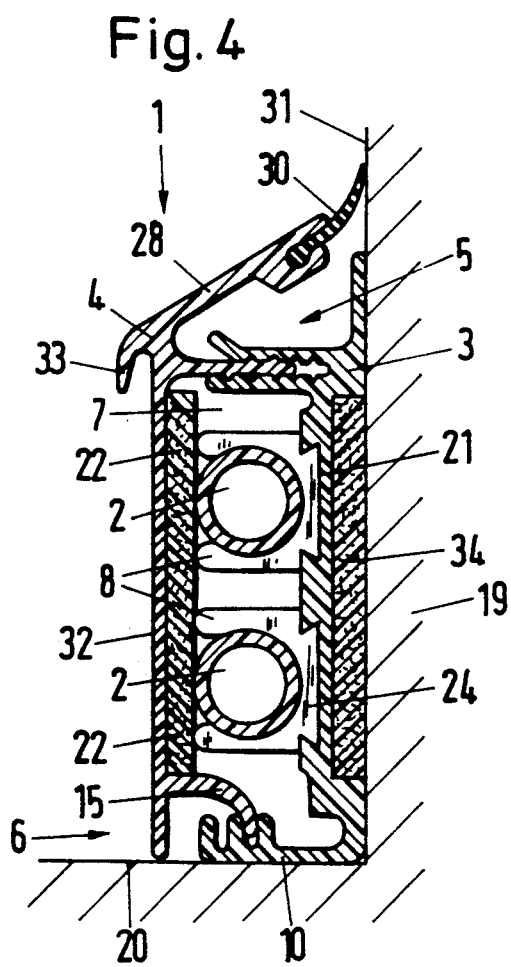
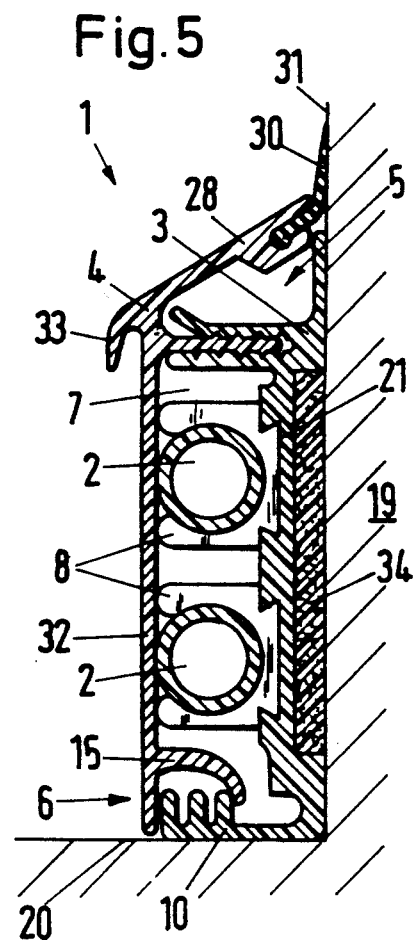

INSTALLATION DUCT FOR UTILITY LINES

The invention relates to an installation duct for utility lines, particularly for pipes, cables, etc.

BACKGROUND OF THE INVENTION

In an installation duct of the type named above and known from the German patent 24, 58 311, the retaining strip and the capping are provided with upper and lower connectors, which form a snap fastener in that a latch clasp of the capping is secured at an upper abutment and, after that, a lower catch at the capping is swung into a corresponding counter-formation, in which it is latched under pressure. The cable or pipe duct, so formed and closed at the periphery, has uniform internal dimensions for accommodating even very different pipelines and with that, a uniform appearance.

SUMMARY OF THE INVENTION

It is an object of the invention to provide an installation duct for utility lines of the initially named type, which can be used in space-saving and optically pleasing manner in a plurality of applications and, at the same time, closes off the cable or pipe duct adequately and safely.

The inventive installation duct is provided with connectors, the structure of which permits a variable configuration of the cable or pipe duct in order to fit it to the different pipe diameters. The step connectors permit the internal dimensions of the cable or pipe duct to be varied with little effort, so that, on the whole, a space saving, optically pleasing installation duct is created for accommodating very different utility lines.

BRIEF DESCRIPTION OF THE DRAWINGS

Reference is made to the following description and the drawing with regard to further advantages and details. An embodiment of the object of the invention is shown diagrammatically in greater detail in the accompanying drawings.

FIG. 2 shows a cross section through an inventive capping in detailed representation, FIG. 3 shows a cross section through the inventive retaining strip in detailed representation, FIG. 4 shows a cross section through the inventive installation duct in the operating position of FIG. 1, FIG. 5 shows a representation similar to that of FIG. 4, with a modified connecting step for the capping.

DESCRIPTION OF THE PREFERRED EMBODIMENTS

Figure 1:
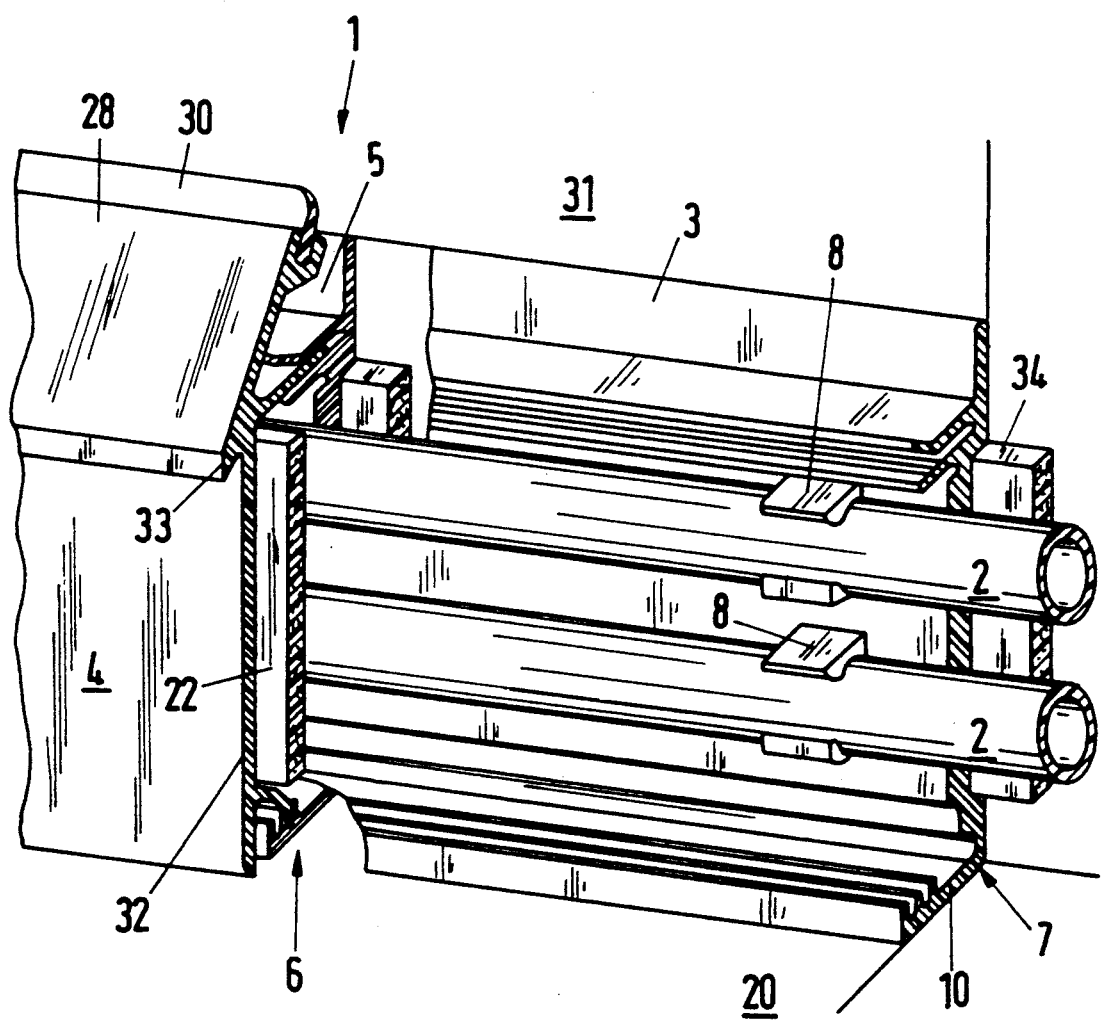
FIG. 1 shows a perspective view of the inventive installation duct in the operating position in a partially sectional representation.

FIG. 1 shows an installation duct, which is labeled 1 as a whole, with interior utility lines 2. The installation duct 1 is formed by a retaining strip 3 and a capping 4, the upper connector 5 and a lower connector 6 being brought into connecting engagement in such a manner, that a cable or pipe duct 7 forms a closed space. In the cable or pipe duct 7, the utility lines 2 are accommodated in pipe holders 8, which in turn are fixed at the retaining strip 3.

The retaining strip 3, which is illustrated more closely in detailed representation in FIG. 3, is constructed as a U-shaped profiled body, which offers in the operating position (FIG. 1) a horizontally aligned upper leg 9 and a lower leg 10. The upper leg 9 is configured as a double leg, which forms the boundary for a plug-in latching pocket 11 for an upper locking arm 12 of the capping 4 (FIG. 2). In an advantageous embodiment, the lower leg 10 of the retaining strip 3 has locking arms 13, which are disposed on the upper side of and along the leg 10 in comb-like fashion in the horizontal direction at a distance from one another. The locking arms 13 have upper edges 14, behind which a lower latch clasp 15 of the capping 4 can be secured so as to lock in different connecting steps of the connectors 5, 6.

The upper locking arm 12 is constructed as a straight arm, which can engage with its form projections 18 the form recesses provided in the plug-in latching pockets 11 provided in the boundary surfaces 17, so that the locking arm 12 of the capping 4 can also occupy different locking position or connecting steps with its form projections 18.

Figure 6:
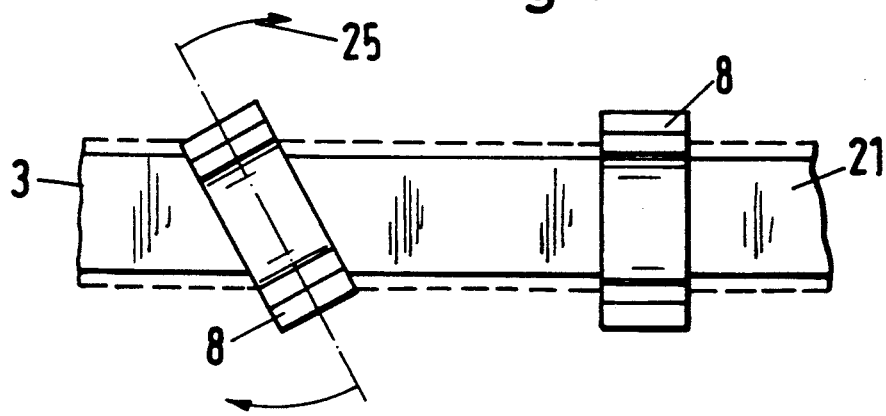
FIG. 6 shows a simplified representation of holders for the utility lines in different fitting positions.
Figure 7:
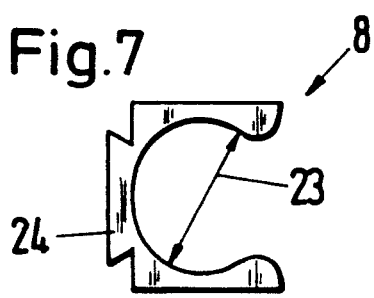
FIG. 7 shows a holder of FIG. 6 in side view.
Figure 9:
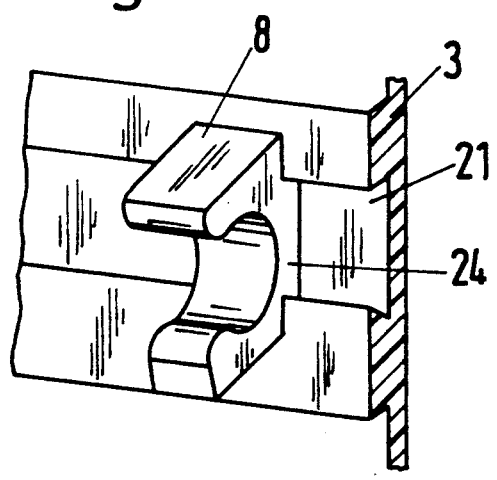
FIG. 9 shows a perspective view of the fitting position of the holder of FIG. 6.

In FIGS. 4 and 5, the installation duct 1 is shown in operating positions with different, selected connecting steps. The retaining strip 3, which is supported at a wall 19 and a bottom 20, carries the holder 8 with the utility lines 2 in latching grooves 21 disposed one above the other (FIGS. 6 and 9). In the embodiment of FIG. 4, the capping 4 carries an inner insulating strip 22. In this connecting position of the capping 4, the upper connectors 5, as well as the lower connectors 6 are disposed in a connecting position, which is further removed from the wall 19 than is the case in the embodiment of FIG. 5.

In the embodiment of FIG. 5, in which the utility lines 2, by way of example, require less thermal insulation, the connectors 5, 6 are locked in the connecting step furthest to the rear, so that the internal dimensions of the cable or pipe duct 7 are reduced to a minimum size.

Figure 8:
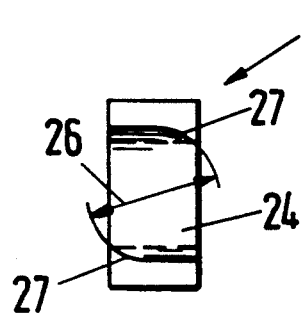
FIG. 8 shows the holder of FIG. 7 in rear view.

The pipe holders 8, which are shown in greater detail in FIGS. 6 to 9, have an internal diameter 23, which is made to fit the different diameters of the utility lines 2, and, with their dovetail locking projections 24, can be connected with a rotational movement shown in shown in FIG. 6 with the retaining strip 3. The pipe holders 8 are horizontally movable in the latching grooves 21 of the retaining strip 3. They can also be locked and unlocked with little effort. For this purpose, the locking projections 24 on the back of the pipe holders 8 are constructed as locking arches 27 with a radius 26 (FIG. 8).

Figure 10:
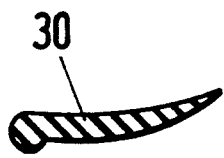
FIG. 10 shows a detailed representation of a sealing lip for the capping.

To improve the overall visual impression of the installation duct 1, the capping 4 is constructed in its upper, visible region with a covering segment 28, which is inclined towards the wall-side bearing surface 31 of the retaining strip 3 (FIG. 1). This covering segment 28 has a form recess 29 (FIG. 2), which faces the bearing surface 31 and into which a projecting, flexible sealing lip 30 (FIG. 10) is introduced. The covering segment 28 is inclined at an angle of 30° to 90° and preferably of 45° to the bearing surface 31 of the wall 19.

In the transition region between the vertical outer side 32 and the covering segment 28, the covering strip 4 has a projecting covering lip 3, which advisably overlaps the upper edge of the bottom cover (not shown), which is extended from the bottom 20 up into the region of the outer side 32.

To improve the thermal insulation of the installation duct 1 when installing, for example, heating pipes, insulating material in the form of the inner insulating strip 22 and an outer insulating strip 34 can be assigned to the cable or pipe duct 7 or to a well-side groove 35 of the retaining strip 3. In an appropriate embodiment, the insulating material is formed from strips of, for example, polyethylene, polystyrene or polyurethane, which are is glued on, so that the installation duct 1 can be adapted to different thermal insulation requirements. The expense of the insulation can be reduced further by forming the insulating material (22, 34) as a layer, such as a layer of integral foam, which is co-extruded with the retaining strip (3) and/or the capping (4).

What I claim is:

1. A utility duct for elongated utility members comprising a retaining strip, a capping member, a first adjustable connecting means adjustably connecting a first section of said retaining strip and a first section of said capping member, a second adjustment connecting means spaced from said first connection means adjustably connecting a second section of said retaining strip and a second section of said capping member, said capping member being thereby adjustably connected to said retaining strip to define between said retaining strip and said capping member an elongated internal passage for said utility members, said internal passage having a width defined by the spacing between said retaining strip and said capping member, said first and second adjustable connecting means being operable to vary said width of said internal passage, said retaining strip and said capping member each have a main wall spaced from one another and with the spacing between said main walls being said width of said internal passage, said first adjustable connecting means comprising a first leg extending generally perpendicular from one of said main walls, said first leg having two leg portions spaced from one another to define a receiving pocket therebetween, and a locking arm extending generally perpendicularly from the other of said main walls and received in said receiving pocket, said second adjustable connecting means comprising a second leg extending generally perpendicularly from one of said main walls, a plurality of spaced locking arms extending transversely from said second leg in a comb-like configuration, a latching member extending from the other main wall and receivable in the spaces between said locking arms, each of said first and second legs being spaced from one another and extending generally perpendicularly from said one main wall, a section on said one main wall between said first and second legs, said section being designated a main wall section, at least one latching groove in said main wall sections, and utility member holders supported in said latching groove, whereby said holders support said elongated utility members in said elongated internal passage.

2. A utility duct according to claim 1, wherein said receiving pocket is an elongated pocket and said locking arms is an elongated straight arm.

3. A utility duct according to claim 1, wherein said leg portions which define said receiving pocket have elongated pocket walls and said locking arm which is received in said receiving pocket has elongated arm surfaces, one of said elongated pocket walls and arm surfaces having spaced recesses, the other of said elongated pocket walls and arm surfaces having spaced projections receivable in said spaced recesses.

4. A utility duct according to claim 1, wherein said latching member is an arch-shaped hook.

5. A utility duct according to claim 1, wherein said latching grooves are elongated and extend the length of said elongated internal passage, said latching grooves having a dovetail cross-sectional configuration.

6. A utility duct according to claim 5, wherein said holders have a latching projection received in said dovetail configured latching groove, said latching projection having one part having a dovetail cross-sectional configuration conforming generally to the dovetail cross-sectional configuration of said latching grooves, said latching projection having opposed arcuate surfaces which enable mounting said dismounting of said latching projection into and from said latching groove by rotating said holder.

7. A utility duct according to claim 1, wherein said holders are slidably mounted in said latching grooves.

8. A utility duct according to claim 1 further comprising a cover part integrally formed with said capping member, said cover part being disposed at an obtuse angle relative to said main wall of said capping member.

9. A utility duct according to claim 8, wherein the utility duct is mountable on a general vertical structural wall, said main wall of said retaining strip being mounted on said structural wall, said cover part being a top cover for the utility duct, said top cover having mounting means for mounting a projecting flexible sealing member which abuts said structural wall.

10. A utility duct according to claim 9, wherein said flexible sealing member extends at an acute angle relative to said structural wall.

11. A utility duct according to claim 9, wherein said top cover extends from said capping member at a transition section of said capping member, said capping member having a cover lip projecting from said transition section and adapted to receive a front cover.

12. A utility duct according to claim 1 further comprising insulating material in said elongated internal passage between said capping member and said holder.

13. A utility duct for elongated utility members comprising a retaining strip, a capping member, a first adjustable connecting means adjustably connecting a first section of said retaining strip and a first section of said capping member, a second adjustable connecting means spaced from said first connection means adjustably connecting a second section of said retaining strip and a second section of said capping member, said capping member being thereby adjustably connected to said retaining strip to define between said retaining strip and said capping member an elongated internal passage for said utility members, said internal passage having a width defined by the spacing between said retaining strip and said capping member, said first and second adjustable connecting means being operable to vary said width of said internal passage, said retaining strip and said capping member each have a main wall spaced from one another and with the spacing between said main walls being said width of said internal passage, said first adjustable connecting means comprising a first leg extending generally perpendicular from one of said main walls, said second adjustable connecting means comprising a second leg extending generally perpendicularly from one of said main walls, each of said first and second legs being spaced from one another and extending generally perpendicularly from said one main wall, a section on said one main wall between said first and second legs, said section being designated a main wall section, at least one latching groove in said main wall section, and utility member holders supported in said latching groove, whereby said holders support said elongated utility members in said elongated internal passage.

14. A utility duct according to claim 13, wherein said retaining strip has an outer groove, and further comprising insulating material in said groove.

15. A utility duct according to claim 14, wherein said insulating material is extruded with said retaining strip.

16. A utility duct according to claim 14, wherein said insulating material is in the form of a strip, said insulating material being selected from one of the group consisting of polyethylene, polystyrene and polyurethane.

17. A utility duct for elongated utility members in which said utility duct is mounted on a generally vertical structural wall, said utility duct comprising a retaining strip, a capping member, a first adjustable connecting means adjustably connecting a first section of said retaining strip and a first section of said capping member, a second adjustable connecting means spaced from said first connecting means adjustably connecting a second section of said retaining strip and a second section of said capping member, said capping member being thereby adjustably connected to said retaining strip to define between said retaining strip to said capping member an elongated internal passage for said utility members, said internal passage having a width defined by the spacing between said retaining strip and said capping member, said first and second adjustable connecting means being operable to vary said width of said internal passage, said retaining strip and said capping member each have a main wall with the distance between said main walls being said width of said internal passage, a cover part integrally formed with said capping member, said cover part being disposed at an obtuse angle relative to said main wall of said capping member, said cover part having an upper end, mounting means on said upper end a projecting flexible sealing member mounted thereon and having a mounting end portions received by said mounting means, said sealing member having an opposite terminating end portion which abuts said structural wall to thereby be disposed parallel to said structural wall, the length of said terminating end portion which abuts said structure wall being variable depending on the width of said internal passage as adjusted by said first and second adjustable connecting means.

18. A utility duct according to claim 17, wherein said sealing member has a varying thickness with said mounting end portion being thicker than said terminating end portion.

19. A utility duct according to claim 18, wherein said terminating end portion has an end, said terminating end portion having a thickness which progressively diminishes as said terminating end is approached.

20. A utility duct according to claim 19, wherein said cover part has a planar top wall, said mounting end portion of said sealing member being disposed generally parallel to said top wall, said mounting end portion being disposed at an obtuse angle relative to said terminating end portion.

21. A utility duct according to claim 20, wherein said sealing member has a juncture section where said mounting end portion joins said terminating end portion, said sealing member flexing at said juncture section as the length of said terminating end portion which abuts said structural wall varied in dependence on the width of said internal passage as adjusted by said first and second adjustable connecting means.

* * * * *